United States Patent
Skinner et al.

(10) Patent No.: US 7,938,863 B2
(45) Date of Patent: May 10, 2011

(54) METHOD, APPARATUS, AND SYSTEM FOR SECURING DATA ON A REMOVABLE MEMORY DEVICE

(75) Inventors: David Norton Skinner, Redwood Shores, CA (US); Yancy Chen, Campbell, CA (US)

(73) Assignee: Hewlett-Packard Development Compnay, L.P., Houston, TX (US)

( * ) Notice: Subject to any disclaimer, the term of this patent is extended or adjusted under 35 U.S.C. 154(b) by 1510 days.

(21) Appl. No.: 11/216,253

(22) Filed: Aug. 30, 2005

(65) Prior Publication Data

US 2007/0061894 A1    Mar. 15, 2007

(51) Int. Cl.
*B65D 85/00*    (2006.01)
*G08B 29/00*    (2006.01)
*G08B 13/00*    (2006.01)

(52) U.S. Cl. ............ 726/35; 726/27; 726/28; 726/34; 206/308.3; 206/307; 206/307.1; 206/308.1; 206/308.2

(58) Field of Classification Search ........... 726/35; 206/308.3
See application file for complete search history.

(56) References Cited

U.S. PATENT DOCUMENTS

| | | | |
|---|---|---|---|
| 6,745,330 B1 * | 6/2004 | Maillot | 726/35 |
| 7,390,201 B1 * | 6/2008 | Quinby et al. | 439/133 |
| 2003/0005337 A1 * | 1/2003 | Poo et al. | 713/202 |
| 2004/0017738 A1 | 1/2004 | Uchida et al. | |
| 2005/0005131 A1 * | 1/2005 | Yoshida et al. | 713/183 |
| 2006/0036872 A1 * | 2/2006 | Yen | 713/183 |
| 2007/0118757 A1 * | 5/2007 | Skinner et al. | 713/186 |
| 2008/0215841 A1 * | 9/2008 | Bolotin et al. | 711/164 |

FOREIGN PATENT DOCUMENTS

| EP | 1 557 741 | | 7/2005 |
|---|---|---|---|
| WO | WO 00/42491 | * | 7/2000 |

OTHER PUBLICATIONS

Skinner, David N., Office Action dated Feb. 1, 2010 in EP Pat. App. No. 06787031.1 filed Jul. 11, 206.

Skinner, David N., Office Action dated Jul. 7, 2008, EP Pat. App. No. 06787031.1 filed Jul. 11, 2006.

* cited by examiner

*Primary Examiner* — Kaveh Abrishamkar (57) ABSTRACT

A method, apparatus, and system for securing data on a removable memory device, which is removably coupled to and accessible by a computing apparatus, are disclosed. Upon an attempt by a user to access the removable memory device, a manual key is recovered by a manual key interface device. This manual key is used to authenticate the identity of the user. Upon the authentication where the user identity corresponds to authorized access to the memory device, the access is enabled. Upon the authentication, where the user identity does not correspond to authorized access to the memory device, the access is prohibited.

20 Claims, 10 Drawing Sheets

METHOD, APPARATUS, AND SYSTEM FOR SECURING DATA ON A REMOVABLE MEMORY DEVICE

TECHNICAL FIELD

An embodiment of the present invention relates to the field of data protection for computer memory systems. More specifically, embodiments of the present invention relate to providing secure and controlled access to removable memory devices and controlling access to removable memory devices on the basis of a manually entered security key.

BACKGROUND

Removable memory devices are found in a wide variety of data-processing systems. Not only traditional data-processing devices such as laptop computers, but other digital equipment such as hand-held computing devices, cameras, personal digital assistants, video gaming consoles, digital video recorders, digital entertainment equipment, and calculators may include hardware, software, and operating system support for removable memory devices.

In the past, removable memory devices were limited to relatively small capacity, low performance solid-state devices, such as flash memory cards. But with improvements in rotating magnetic storage technology, practical and affordable removable disk drive designs have become common. These removable memory devices offer substantial improvements in capacity, performance, and practicality. In addition, advances in digital technology have increased the storage capacity available in a practical removable solid-state memory device. Finally, emerging technologies promise greater capacities with better performance and lower costs aimed at the portable and removable storage markets.

As capacity, performance, and usefulness of removable memory devices continue to improve, many data processing systems have begun to rely on removable memory devices for the majority of the system's non-volatile storage. Even large desktop computing systems employ removable memory devices to facilitate data portability between systems. For example, a user can carry large quantities of data from home to work, or while traveling, increasing productivity. Other uses include archiving data, and storing digital entertainment data, such as video or music, for use later.

One result of these advances in removable and portable memory devices is that users tend to store much more data on removable memory devices. As removable memory device reliability has improved, a larger quantity of mission-critical or sensitive data is being stored on removable memory devices. Furthermore, as the devices have become smaller, more desirable, and more common it is inevitable that a larger number of them are eventually possessed by persons who do not own nor have permission to access the data on the removable memory devices in their possession.

While having large quantities of data easily portable and available is advantageous to the intended users, the potentially sensitive nature, personal aspects, and financial value of the data that may be stored on a removable storage device make it essential that the data remain secure, even if the removable memory device is not in an authorized user's possession.

Traditionally, access to data has been restricted by a combination of password controls and encryption. But software-based passwords and encryption are often inadequate, because the high performance data interface that makes these devices attractive to customers also enables high-speed attacks. Password attacks can be as simple as a computer program that attempts every possible password. The password attack, in particular, is dependent on a high-speed electronic access to the password mechanism to allow an automated, brute force attack. Encryption attacks are based on mathematical analysis of encrypted data, so a security method that allows access to the encrypted user data also facilitates the encryption attack.

Therefore, what is needed is a means to provide greater security without the potential weakness of a software-based password system or encryption system that will keep the data stored on the removable memory device secure any time it is not in an authorized user's possession. What is needed is a secure password method that is not easily susceptible to a brute force password attack. Additionally, what is needed is a security system that restricts any type of access to the user data, whether encrypted or not, in the absence of proper authorization and permission.

SUMMARY

A removable memory device, which is removably coupled to and accessible by a computing apparatus is disclosed. Upon an attempt by a user to access the removable memory device, a manual key is recovered by a manual key interface device. This manual key is used to authenticate the identity of the user. Upon the authentication where the user identity corresponds to authorized access to the memory device, the access is enabled. Upon the authentication, where the user identity does not correspond to authorized access to the memory device, the access is prohibited.

BRIEF DESCRIPTION OF THE DRAWINGS

The accompanying drawings, which are incorporated in and form a part of this specification, illustrate embodiments of the invention and, together with the description, serve to explain the principles of the invention. These drawings depict exemplary embodiments and are not meant to limit the present invention. For instance, FIG. 1 is not to be interpreted as limiting the invention to a personal computer data processing apparatus. The drawings are not to scale.

DETAILED DESCRIPTION

A method, apparatus, and system for securing access to a removable memory device are described herein. Reference is now made in detail to exemplary embodiments of the invention, examples of which are illustrated in the accompanying drawing figures. While the invention is described herein in conjunction with these exemplary embodiments, this description is not intended to limit the invention to these embodiments. On the contrary, the invention is intended to cover alternatives, modifications and equivalents, which may be included within the spirit and scope of the invention as defined by the appended claims.

Furthermore, in the following detailed description of exemplary embodiments of the present invention, numerous specific details are set forth in order to provide a thorough understanding of the present invention. However, one of ordinary skill in the art will realize that embodiments of the present invention may be practiced without these specific details. In other instances, well-known devices, circuits, methods, processes, procedures, systems, components, and apparatus, etc. have not been described in detail so as not to unnecessarily obscure aspects of the present invention.

In particular, a "manual key interface" may include but is not limited to any type of manually-operated or manipulated device that produces a signal, state, output, etc., which can be correlated to a user's identity, condition, proximity, presence, etc. Further, a "mechanical access device" may include but is not limited to any type of mechanical, electro-mechanical, hydraulic, pneumatic, etc device that can effectively latch, contain, constrain, or prohibit physical movement between at least two components.

A portion of the detailed description that follows is presented and discussed in terms of a method. Although steps and sequencing thereof are disclosed in a figure herein (e.g., FIG. 5) describing the operations of this method (e.g., process 500), such steps and sequencing are exemplary. Embodiments of the present invention are well suited to performing various other steps or variations of the steps recited in the flowchart of the figure herein, and in a sequence other than that depicted and described herein.

Embodiments of the present invention provide an apparatus, system, and a method for securing access to a removable memory device. In one embodiment, security is established by a manual key interface, manually activated with a manual key corresponding to a user provided by a user. The key is used to effectively identify the user, the user's proximity, and establish the data access permissions. In one embodiment the removable memory device is secured by controlling the electronic signals between the removable memory device and the data processing apparatus it is attached to, effectively preventing unauthorized access. In one embodiment the removable memory device is secured by physically constraining the removable memory device within the data processing apparatus, effectively preventing the removal of the removable memory device. An embodiment of the present invention provides a computer-implemented method for controlling access to a removable memory device Therefore, embodiments of the present invention provide an increased level of security over present electronic or software-based password and data encryption methods; permitting access to a removable memory device to an authorized user and preventing access to a removable memory device to a user who is not an authorized accessor. Also, embodiments of the present invention employ a manual key interface to eliminate the use of electronic passwords and the inherent security weaknesses posed by password attacks therein. Further, embodiments of the present invention can prohibit access to any aspect of the user data in the absence of proper authorization and permission, thereby eliminating the weakness of cryptographic data protection schemes.

Exemplary Data Processing Apparatus with Removable Memory

Figure 1:
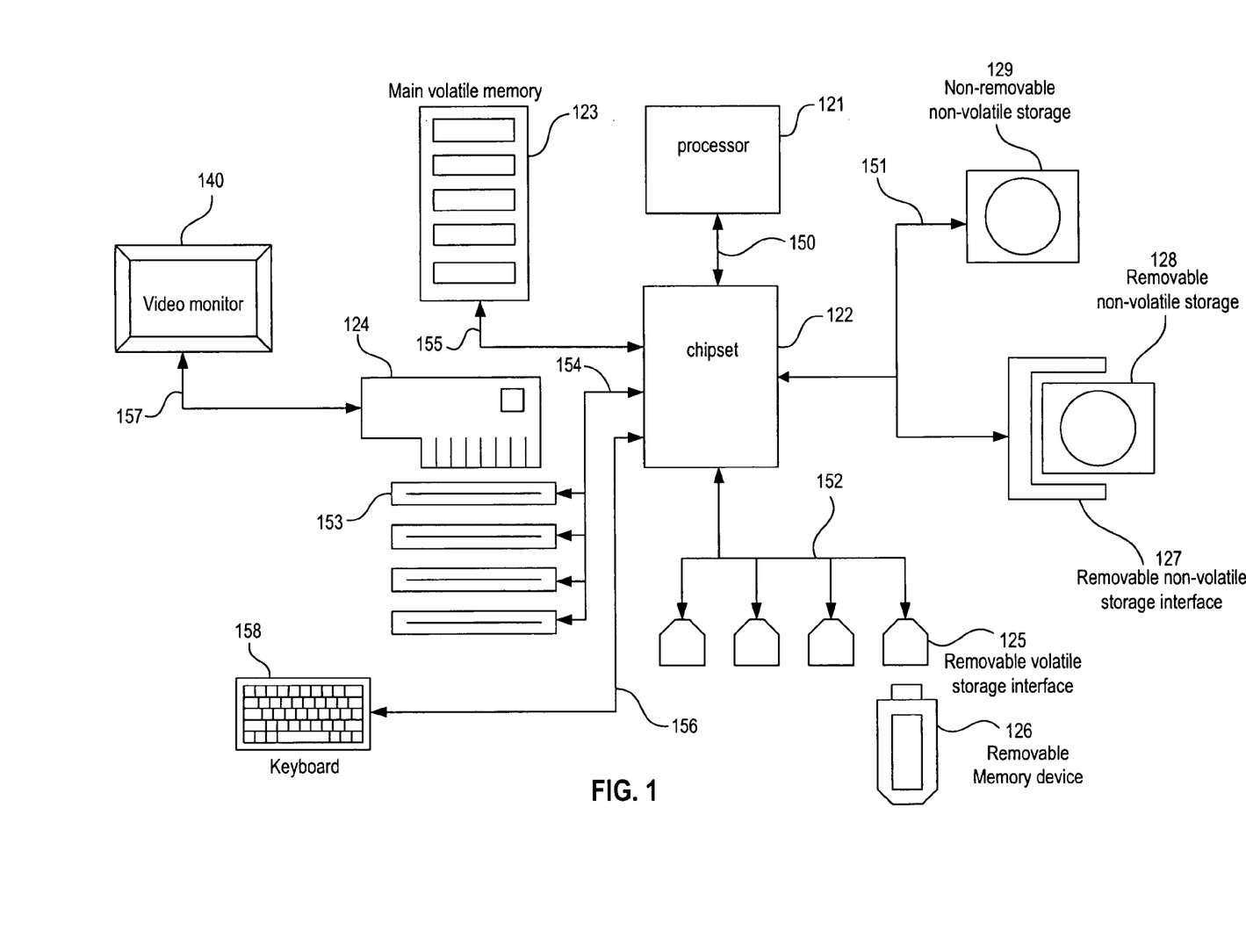
FIG. 1 depicts an exemplary data processing apparatus in accordance with one embodiment of the present invention.

FIG. 1 depicts a functional block diagram of an exemplary data processing apparatus according to an embodiment of the present invention. Processor 121 is connected by data bus 150 to chipset 122. Chipset 122 provides data interconnection paths and access arbitration to the other peripheral components of the data processing apparatus. Main volatile memory bank 123 is connected to chipset 122 via memory bus 155. Expansion slots, one of which is denoted 153, are connected to the chipset via expansion bus 154. Video adapter board 124 is attached to expansion slot 153 and drives video monitor 140 via video cable 157 to provide user output. Keyboard 158 is connected to chipset 122 via cable 156 for user input. Interface connector 125, is connected to chipset 122 via data interconnect bus 152. Removable memory device 126 is removably coupled with interface 125. Interface 125 provides bi-directional data, device control, bus control, and power source to removable memory device 126. Chipset 122 is attached to expansion bus 151, which carries bi-directional data, device control, bus control, and power source to non-removable, non-volatile storage 129. Expansion bus 151 also carries bi-directional data, device control, bus control, and power source to interface 127. Removable memory device 128 is removably coupled with interface 127. Interface 127 provides any combination of bi-directional data, device control, bus control, and power source to removable memory device 128.

Exemplary Electronic Removable Memory Securing Apparatus

Figure 2:
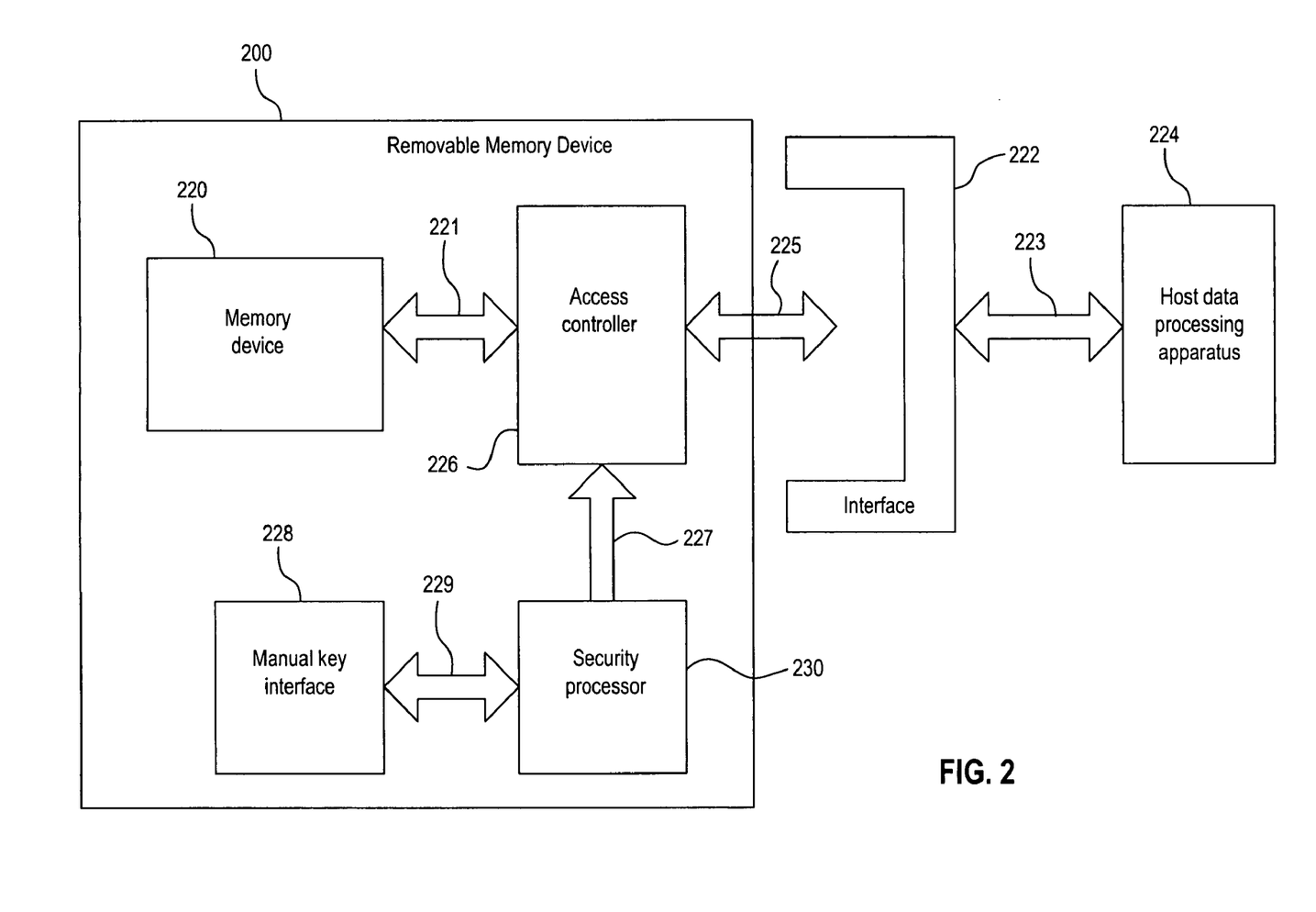
FIG. 2 is a functional block diagram depicting an exemplary removable memory device with an apparatus for securing electronic data access based on a manual key according to an embodiment of the present invention.

FIG. 2 depicts a functional block diagram of an exemplary data securing apparatus according to an embodiment of the present invention. In this example, removable memory device 200 is removably coupled to the host data processing apparatus 224 via interface 222 and expansion bus 223. Interface 222 may provide any combination of mechanical, electrical power, data, and device control functions to removable memory device 200.

Removable memory device 200 comprises memory device 220, which stores user data. Memory device 220 is connected to electronic access controller 226 via digital bus 221. Electronic access controller 226 performs a switch function selectively permitting or prohibiting data transfer between the host data processing apparatus interface 222 and memory device 220 via removable memory device interface connector 225, subject to control signals from security processor 230 via control bus 227.

Manual key interface 228 is manually activated with a key corresponding to a user provided by a user for use by security processor 230. Manual key interface 228 is electrically coupled to and communicates with security processor 230 via interconnect bus 229. Security processor 230 controls electronic access controller 226 via control bus 227 to permit or prohibit access to memory device 220 via digital bus 221 in accordance with a suitable algorithm, e.g. the System 4 described in FIG. 4 and Method 500 in FIG. 5.

It is appreciated that as long as electronic access controller 226 remains in the "prohibit" function, as instructed by security processor 230, no access to memory device 220 is possible. It is further appreciated that the memory device exemplified herein with reference to memory device 220 can have any shape, size, configuration, orientation, etc., and can consist of any kind of memory device, disk drive, circuitry, electronic apparatus, etc.

Exemplary Mechanical Removable Memory Securing Apparatus

Figure 3:
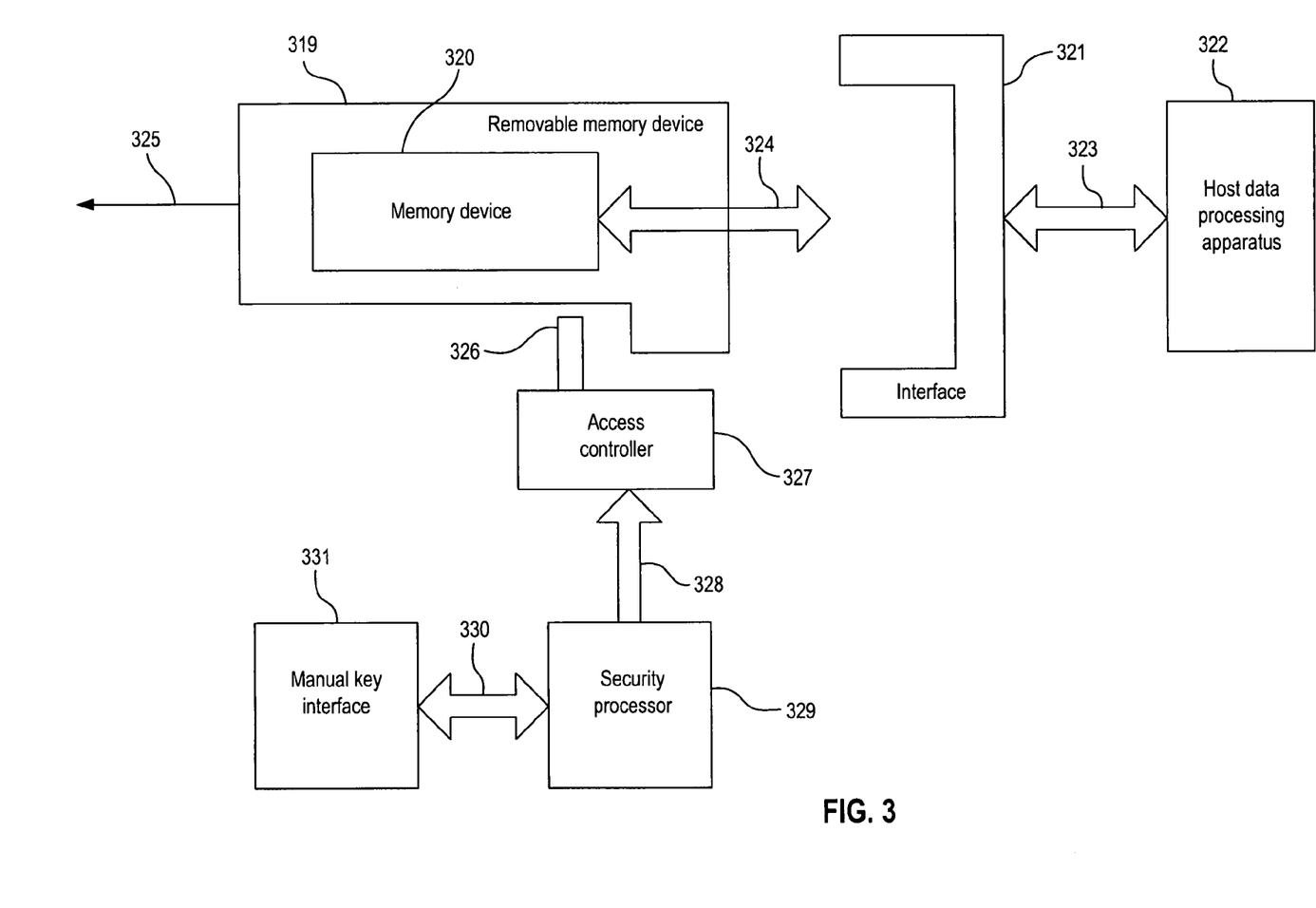
FIG. 3 is a functional block diagram depicting an exemplary removable memory device with an apparatus for securing physical access based on a manual key according to an embodiment of the present invention.

FIG. 3 depicts a functional block diagram of an exemplary removable memory device securing apparatus according to an embodiment of the present invention. In this example, interface 321 is physically attached to the host data processing apparatus 322 and may provide any combination of mechanical, electrical power, data, and device control functions to removable memory device 319, via interconnect 323 and host interconnect 324. Removable memory device 319 is removably coupled to host data processing apparatus 322 via interface 321.

Removable memory device 319 comprises memory device 320, wherein user data is stored, and host interconnect 324 which conveys any combination of device control, electrical power, data, or mechanical coupling to the interface 321. Mechanical constraining device 326 is controlled by access controller 327 and has an interference coupling with removable memory device 319, selectively preventing removal of removable memory device 319 in the direction denoted by arrow 325.

Manual key interface 331 is manually activated with a key corresponding to a user from a user for use by security processor 329. Manual key interface 331 is electrically coupled to and communicates with security processor 329 by interconnect bus 330. Security processor 329 obtains manual key aspects from manual key interface 331 via interconnect bus 330 and controls electronic access controller 327 via interconnect bus 328. Security processor 329 performs a suitable algorithm, e.g. System 4 described in FIG. 4 and Method 500 in FIG. 5, to control access controller 327. Access controller 327 is controlled by security processor 329 to either permit or prohibit access to removable memory device 319. When instructed to permit, access controller 327 positions mechanical constraining device 326 to permit removal of removable memory device 319 in the direction indicated by arrow 325. When instructed to prohibit, access controller 327 positions mechanical constraining device 326 to constrain removal of removable memory device 319 in the direction indicated by arrow 325.

It is appreciated that as long as mechanical controller 327 remains in the "prohibit" function state, as instructed by security processor 329, mechanical constraining device 326 functions to effectively constrain removable memory device 319 and not allow removable memory device 319 to be removed from host data processing apparatus 322 without permanent, irreparable damage to removable memory device 319 with the ultimate effect of rendering removable memory device 319 unusable and inert. Hence, removable memory device 319 is secured. It is also appreciated that the memory device exemplified herein with reference to memory device 320 can have any shape, size, configuration, orientation, etc., and can consist of any kind of memory device, disk drive, circuitry, electronic apparatus, etc.

It is further appreciated that embodiments of the present invention may be practiced with functionality, exemplified herein with reference to mechanical restraining device 326, access controller 327, security processor 329, and manual key interface 331, wherein the listed components are positioned, configured, oriented, etc. in such a way that the location of any or all of mechanical restraining device 326, access controller 327, security processor 329, or manual key interface 331 is not limited to attachment to the host data processing apparatus 322, nor to the removable memory device 319. In fact, any or all of mechanical restraining device 326, access controller 327, security processor 329, or manual key interface 331 may be positioned, configured, oriented, etc in a variety of ingenious positions, configurations, orientations, etc, according to an embodiment of the present invention.

Exemplary Removable Memory Securing System

Figure 4:
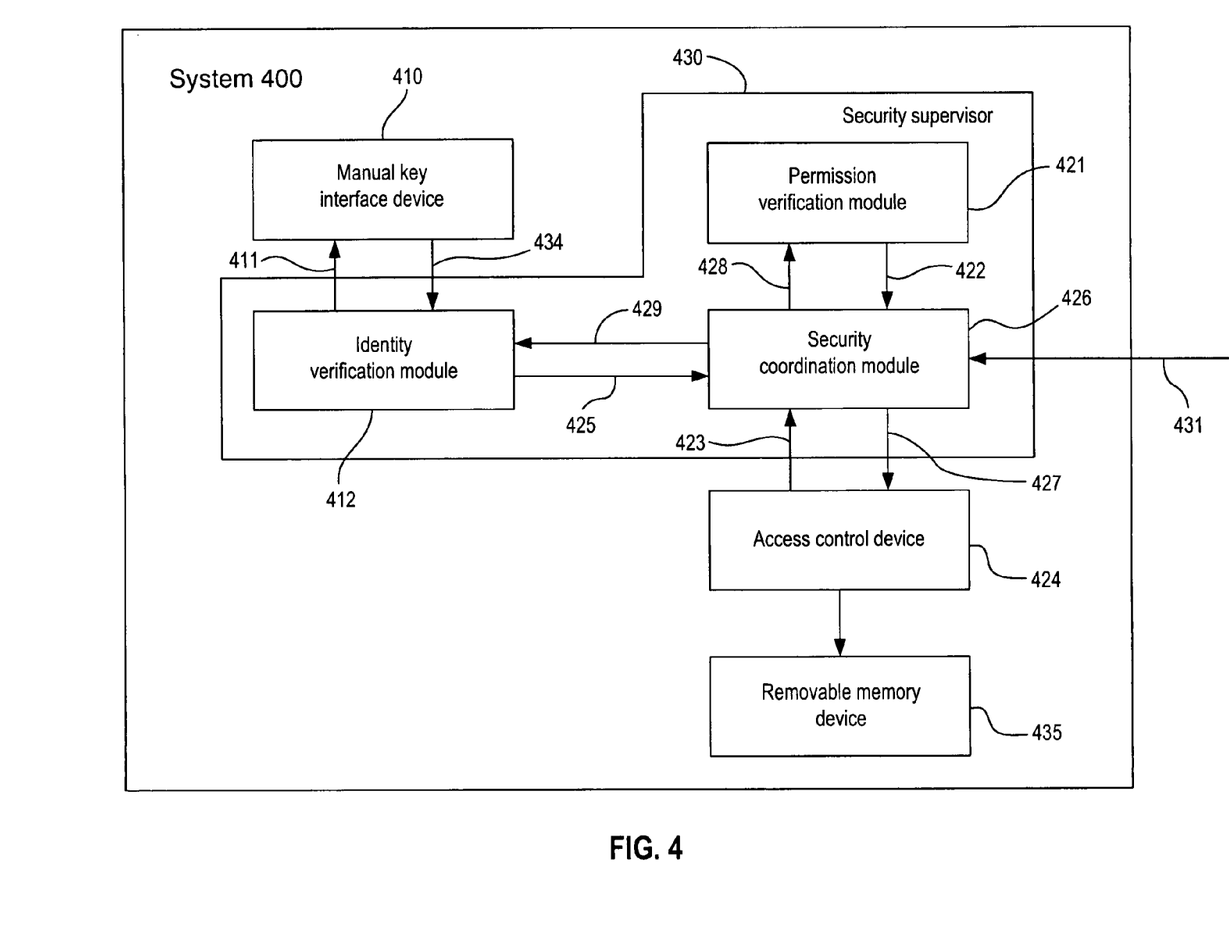
FIG. 4 depicts an exemplary removable memory device security system having a security processor, a manual key interface, and an access controller according to an embodiment of the present invention.

FIG. 4 depicts an exemplary removable memory securing system according to the present invention. Access request message 431 notifies security coordination module 426 of a pending access request, initiating a user authentication and verification method, e.g. Method 500 as described in FIG. 5. Security coordination module 426, coordinating the steps of the security verification method, dispatches identity request message 425 to identity verification module 412. Identity verification module 412 activates manual key interface 410 via link 411. Manual key interface device 410 dispatches key value message 434 to identity verification module 412. Data conveyed by key value message 434 conveys some state of manual key interface 410 that is correlated with some aspect of a user interfacing with manual key interface device 410. In one embodiment manual key interface device 410 dispatches key value message 434 conveying a password. In another embodiment, manual key interface device 410 dispatches key value message 434 conveying a description of a user's identity. It is appreciated that the present invention may be practiced, with respect to manual key interface device 410, with a variety of manual data entry devices, e.g. tumblers, dials, switches, pushbuttons, magnetic sensors, traditional pin-tumbler lock keys, etc, as is appropriate for the type of access control that is desired.

Identity verification module 412 processes the data conveyed via key value message 434 and dispatches a user identity message 425 to security coordination module 426. Data conveyed by user identity message 425 conveys some aspect of the user's identity. Security coordination module 426 dispatches permission request message 428 to permission verification module 421. Data conveyed by permission request message 428 conveys some aspect of some combination of any or all of an aspect of the access request, an aspect of the user's identity, an aspect of memory device 435's state, or any other condition, state, status, input, etc. Permission verification module 421 processes data conveyed by permission request message 428 and dispatches a permission status message 422 to security coordination module 426. Data conveyed by permission status message 422 conveys some aspect of the permissions attributable to said user interfacing with manual key interface device 410.

Security coordination module 426 processes any or all of data conveyed by permission status message 422, user identity message 425, access request message 431, access request message 427, or any other condition, state, status, input, data, etc then dispatches access control message 423 to access control device 424. Data conveyed by access control message 423 comprises some aspect of permitting or prohibiting access to memory device 435.

Access control device 424 either permits or prohibits access to removable memory device 435 based on some aspect of the data conveyed by access control message 423. Access control device 424 can consist of an electronic data switch, electro-mechanical latch, electro-hydraulic securing mechanism, or any other mechanism that will effectively permit or prohibit access to some aspect of memory device 435. Data conveyed by access control message 423 instructs access control module 424 to set itself in the "permit" or "prohibit" state, thereby selectively securing access control to removable memory device 435.

Access control device 424 receives access control message 423 from security coordination module 426. In one embodiment, access control device 424 may dispatch access request message 427, e.g. upon an attempt to physically remove the protected removable memory device 435. Access request message 427 notifies security coordination module 426 of a pending access request, initiating a user authentication and verification method, e.g. Method 500 as described in FIG. 5.

It is appreciated that the present invention may be practiced, with respect to access control device 424, with a variety of mechanisms, components, systems, or devices that will effectively permit or deny access to some aspect of memory device 435.

Exemplary Removable Memory Securing Method

Figure 5:
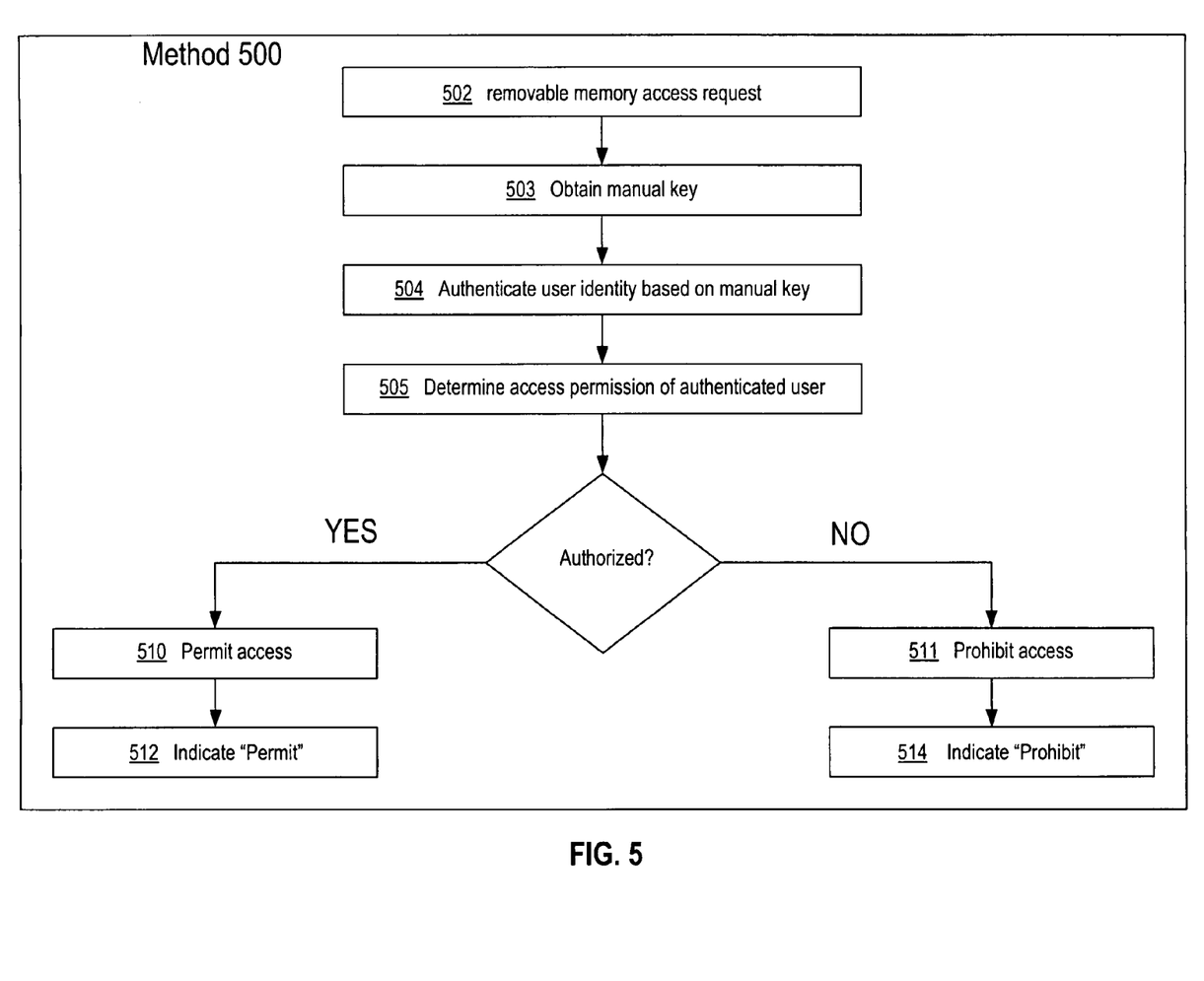
FIG. 5 is a flowchart of an exemplary process for securing a removable memory device from access by an unauthorized user according to an embodiment of the present invention.

FIG. 5 is a flowchart of an exemplary method 500 for securing access to a removable memory device using an embodiment of the present invention.

In Step 502, a request is made to access a removable memory device. The request can include attempts or requests to perform any or all of: reading data, writing data, modifying data, deleting data, accessing device control functions, removal of the memory device, or any other action.

In Step 503, a manually entered key is obtained from a manual key interface activated with a data from a user.

In Step 504 the security system correlates the manual key with a unique individual.

In Step 505, the access permission module determines the access permission of the user identified in Step 504. If the identified user authorization for the requested access is determined to be "authorized" step 510 is executed. If the user is not in the "authorized" list, Step 511 is executed.

In Step 510, an authorized user is given access to the removable memory device.

In Step 512, an indication is provided to indicate access is permitted.

In Step 511, a non-authorized user is not given access to the removable memory device.

In Step 514, an indication is provided to indicate access is prohibited.

While flow chart 500 shows a specific sequence of steps characteristic of one embodiment, other embodiments of the present invention are well suited to function with more or fewer steps. Likewise, the sequences of steps in various such embodiments can vary from those exemplified with process 500, e.g., depending upon the application.

It is appreciated that the term "access", as described in Method 500, steps 502, 511, and 512, may refer to electronic signals, mechanical displacement, or any other operation that could modify or change the state of any aspect of the removable memory device.

Also, it is appreciated that the term "indicate", as described in Method 500, steps 512 and 514, may refer to any type of indicator useful to the function of the removable memory device, including any or all of visual indicators, audible indicators, electronic signals, etc.

Exemplary Removable Memory Securing Apparatus with Manual Key Entry

Figure 6:
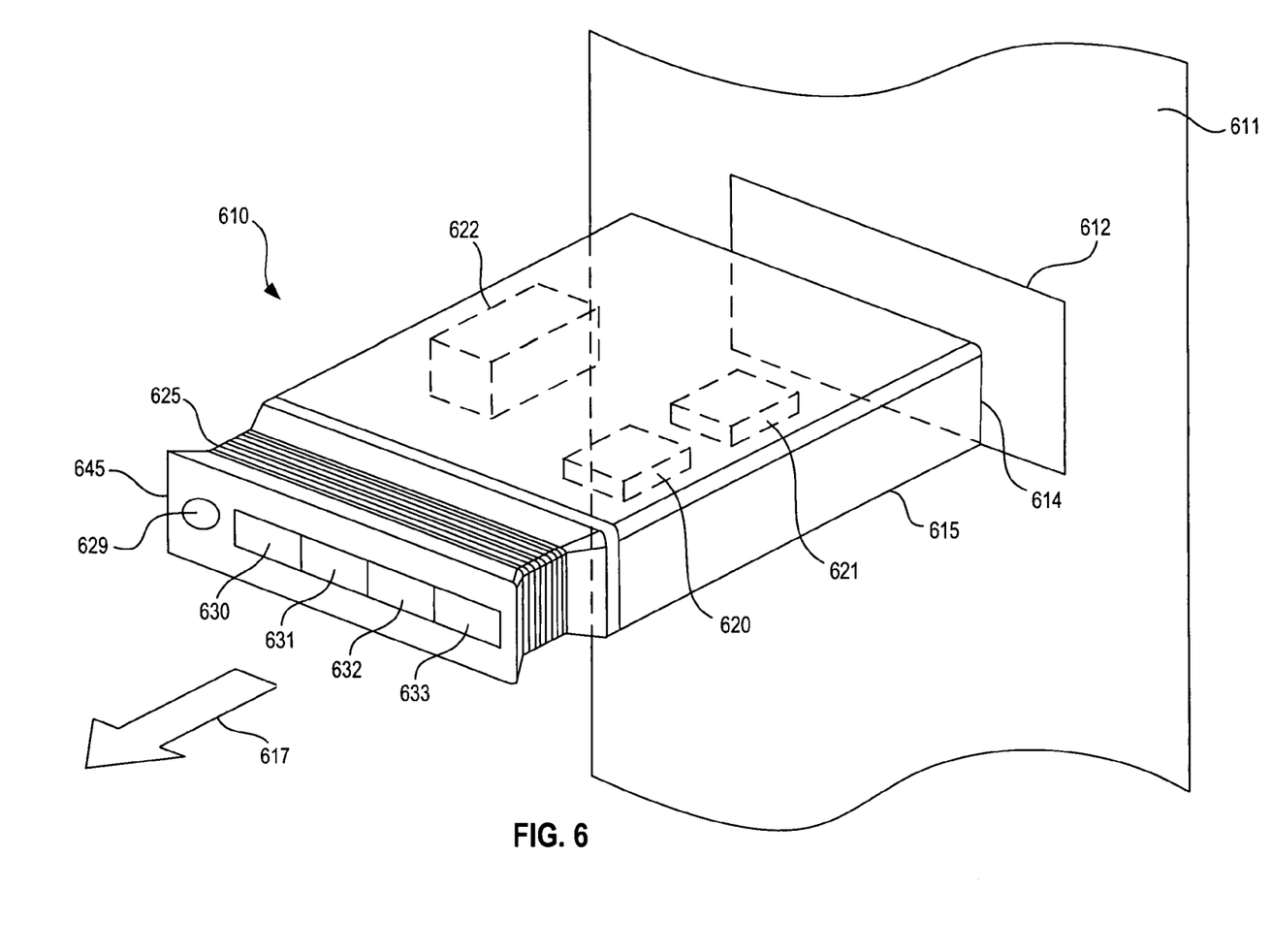
FIG. 6 shows an exemplary removable memory device having a security processor, an electronic access controller, and a pressure sensitive switch manual key interface in accordance with an embodiment of the present invention.

FIG. 6 depicts an exemplary removable storage device according to an embodiment of the present invention, in a view to demonstrate an exemplary configuration of certain components. In this example, removable memory device 610 has a handle 625 to facilitate removal in the direction denoted by arrow 617 and has a security processor 620, located within housing 615, an electronic access controller 621, located within housing 615, and a manual key interface device 645 which is manually activated with data corresponding to a user. In this example, the manual key interface output and state corresponds to a pattern and sequence applied to one or more of pressure-sensitive switches 630, 631, 632, and 633.

Host data processing apparatus 611 possess a removable memory interfaced connector 612, which conveys any combination of device control, electrical power, data, or mechanical coupling to removable memory device 610's host data processing apparatus interface 614. Removable memory device 610 is removably attachable to removable memory interfaced connector 612, and can be separated from removable memory interfaced connector 612 in the direction denoted by arrow 617. Manual key interface device 645 provides means for a user to supply a data to security processor 620, which controls electronic access controller 621 and status indicator 629.

Security processor 620 controls electronic access controller 621 to allow or deny access to memory 622 in accordance with a suitable method, e.g. the System 4 described in FIG. 4 and Method 500 in FIG. 5. Security processor 620 also controls status indicator 629 to indicate an aspect of the current state of removable memory device 610, e.g. whether access controller 612 is in the permit or prohibit state.

It is appreciated that as long as electronic access controller 621 remains in the "prohibit" function, as instructed by security processor 620, no access to memory device 622 is possible. It is further appreciated that the memory device exemplified herein with reference to memory device 622 can have any shape, size, configuration, orientation, etc., and can consist of any kind of memory device, circuitry, electronic apparatus, etc.

It is also appreciated that embodiments of the present invention may be practiced with functionality, exemplified herein with reference to manual key interface 645, wherein the manual key interface 645 is positioned, configured, oriented, etc. in such a way that the location of manual key interface 645 is not limited to a particular attachment to housing 615. In fact, manual key interface 645 may be positioned, configured, oriented, etc in a variety of ingenious positions, configurations, orientations, etc, according to an embodiment of the present invention.

It is further appreciated that embodiments of the present invention may be practiced with functionality, exemplified herein with reference to manual key interface 645, in such a way that the nature of manual key interface 645 is not limited to an array of pressure-sensitive switches. In fact, manual key interface 645 may respond and operate with one or more of a variety of manual signals or manipulations, including, but not limited to: knobs, pushbuttons, capacitive sensing devices, touch screens, temperature sensors, dials, etc.

Exemplary Removable Memory Securing Apparatus with Manual Key Entry

Figure 7:
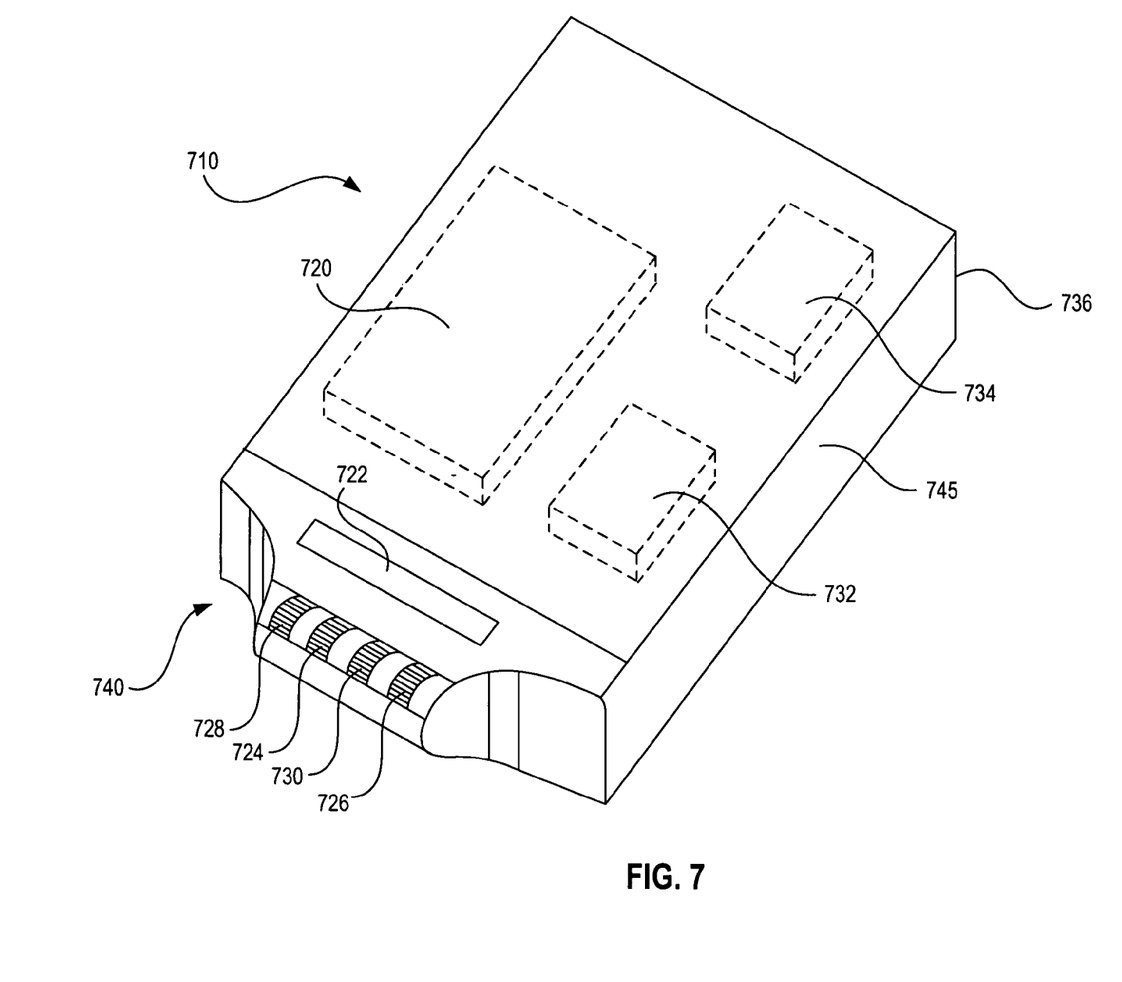
FIG. 7 shows an exemplary removable memory device having a security processor, an electronic access controller, and a thumbwheel manual key interface in accordance with an embodiment of the present invention.

FIG. 7 depicts an exemplary removable storage device according to an embodiment of the present invention, in a view to demonstrate an exemplary configuration of certain components. In this example, removable memory device 710 has a housing 745, a manual entry device 740 consisting of status indicator 722 and manual key input thumbwheels 724, 726, 728, and 730.

To provide a manual key, a user manipulates manual key input thumbwheels 724, 726, 728, and 730. Manual key interface 740 recovers a manually entered key from a user for use by security processor 732, hence security processor 732 receives aspects of a manual key from manual key interface 740. Manual key interface 740 is electrically coupled to and communicates with security processor 732. Security processor 732 controls electronic access controller 734 to allow or deny access to memory device 720 in accordance with a suitable algorithm, e.g. the System 4 described in FIG. 4 and Method 500 in FIG. 5. Security processor 732 also controls status indicator 722 to indicate an aspect of the current state of removable memory device 710, e.g. whether access controller 734 is in the permit or prohibit state.

It is appreciated that as long as electronic access controller 734 remains in the "prohibit" state, as instructed by security processor 732, no access to memory device 720 is possible. It is further appreciated that the memory device exemplified herein with reference to memory device 720 can have any shape, size, configuration, orientation, etc., and can consist of any kind of memory device, disk drive, circuitry, electronic apparatus, etc.

It is appreciated that embodiments of the present invention may be practiced with functionality, exemplified herein with reference to manual key interface 740, wherein the manual key interface 740 is positioned, configured, oriented, etc. in such a way that the location of manual key interface 740 is not limited to a particular attachment to housing 745. In fact, manual key interface 740 may be positioned, configured, oriented, etc in a variety of ingenious positions, configurations, orientations, etc, according to an embodiment of the present invention.

It is further appreciated that embodiments of the present invention may be practiced with functionality, exemplified herein with reference to manual key interface 740, in such a way that the nature of manual key interface 740 is not limited to thumbwheels such as thumbwheel 724. In fact, manual key interface 740 may respond or operate with one or more of a variety of manual signals or manipulatable features, including, but not limited to: knobs, pushbuttons, capacitive sensing devices, touch screens, temperature sensors, dials, etc.

Exemplary Manual Key Interface Device

Figure 8:
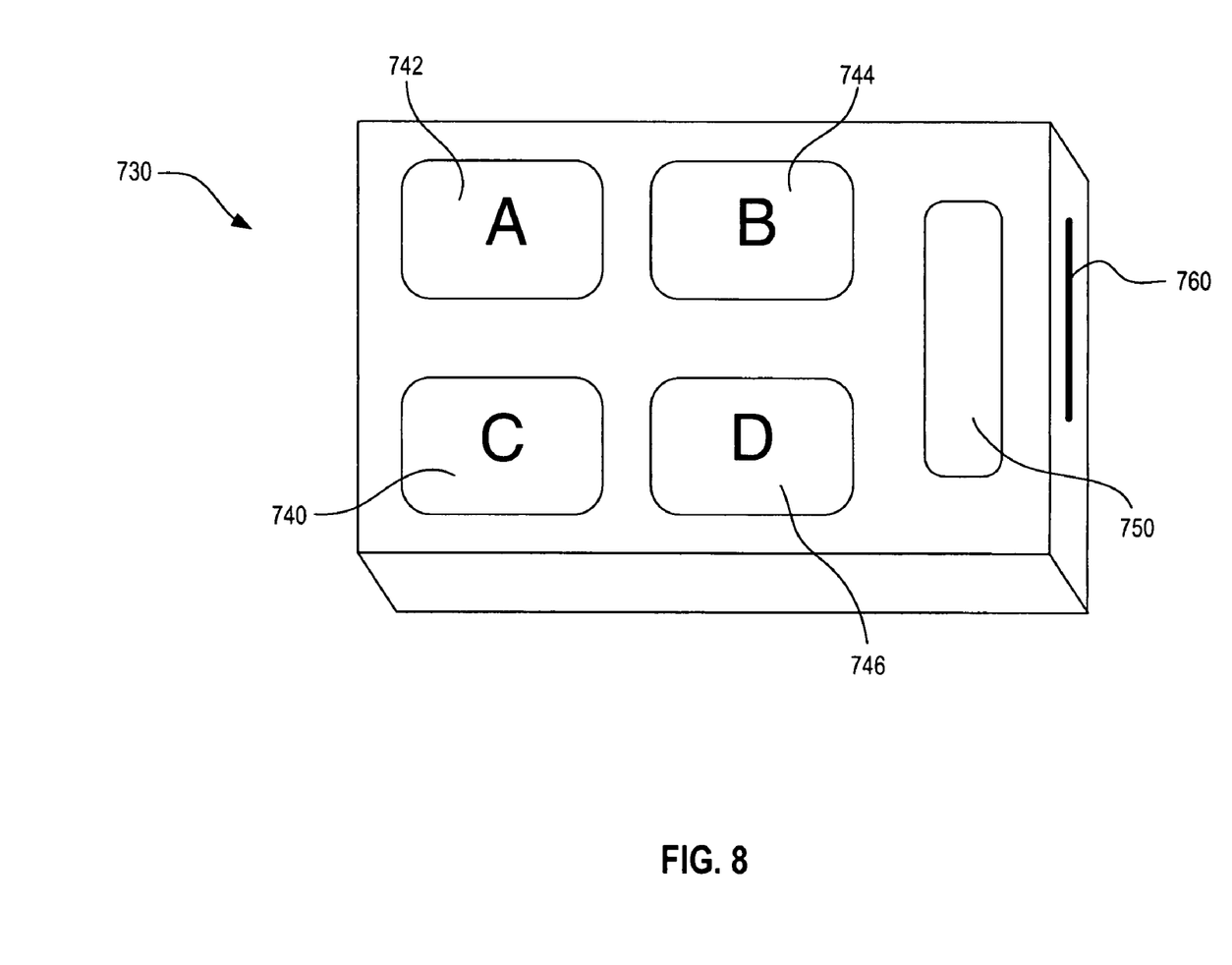
FIG. 8 depicts aspects of an exemplary manual key interface memory device employing a pressure sensitive switch matrix in accordance with an embodiment of the present invention.

FIG. 8 depicts an exemplary manual key interface according to an embodiment of the present invention. Exemplary manual key interface 730 has pressure sensitive membrane switches 740, 742, 744, and 746. Each or any of pressure sensitive membrane switches 740, 742, 744, and 746 may be labeled with a designating letter or numeral. Status indicator 750 provides visual feedback to a user, indicating some aspect of a status, said status representing some aspect of a removable memory device that might be valuable to a user. Interconnect port 760 provides a means to supply any combination or selection of power, status signals, data interconnections, etc, as required by the specific application of manual key interface 730.

It is appreciated that embodiments of the present invention may be practiced with functionality, exemplified herein with reference to manual key interface 730, in such a way that the nature of manual key interface 730 is not limited to a matrix of membrane switches. In fact, manual key interface 730 may respond to or operate with one or more of a variety of manual signals or manipulatable features, including, but not limited to: knobs, pushbuttons, capacitive sensing devices, touch screens, temperature sensors, dials, etc.

It is appreciated that embodiments of the present invention may be practiced with functionality, exemplified herein with reference to status indicator 750, in such a way that the nature of status indicator 750 is not limited to a particular notifying device. In fact, status indicator 750 may include any combination of one or more visual indicators, e.g. light emitting diode, mechanical flag, liquid crystal display, etc, and audible indicators, e.g. buzzer, oscillator, etc.

Exemplary Removable USB Memory Device Securing Apparatus

Figure 9:
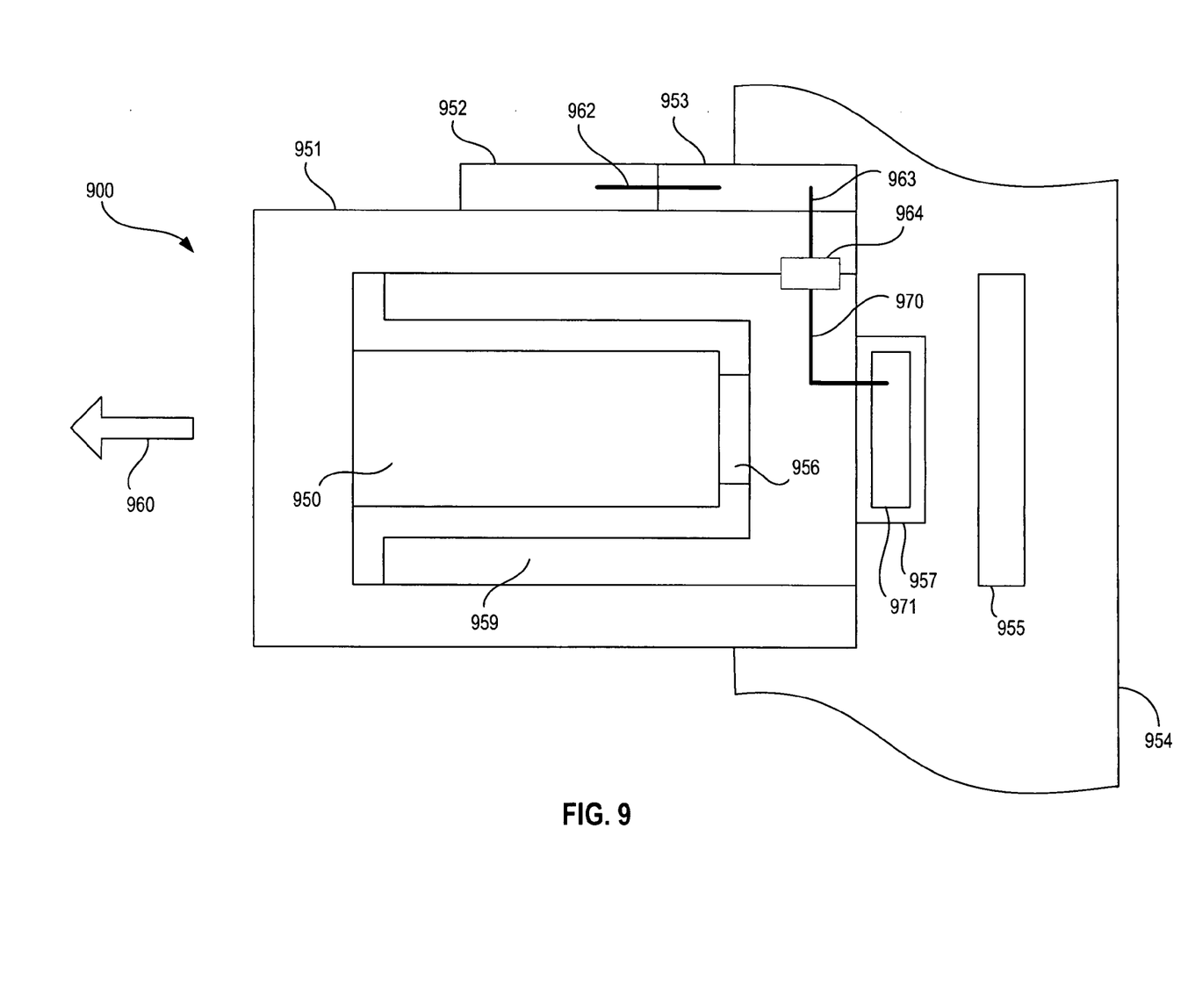
FIG. 9 depicts an exemplary removable memory device having a security processor, mechanical access controller, electronic access controller, manual key interface and an industry-standard removable memory device in a "secured" mode in accordance with an embodiment of the present invention.

FIG. 9 depicts an exemplary removable memory device security adapter apparatus according to an embodiment of the present invention. Removable memory device adapter apparatus 900 is illustrated in the "closed" or "secured" condition. Host data processing apparatus interface connector 955 is part of the host data processing apparatus 954, and serves as the host data processing apparatus 954's access to the removable memory device.

The removable memory device adapter apparatus 900 comprises a standard removable memory device 950, e.g. USB Thumb Drive, effectively contained and constrained by outer housing 951 and inner housing 959. The standard removable memory device interface connector 956 engages interface connector 957. Interface connector 957 communicates the bi-directional power, control, and data signals between the removable memory device 950 and the host data processing apparatus interface connector 955, subject to the state of electronic access controller 971. Electronic access controller 971 performs a switching function selectively permitting or prohibiting data transfer between the host data processing apparatus interface and the standard removable memory device 950, subject to control signals from security processor 953 via control bus 970.

Latch 964 performs a latching function, mechanically securing outer housing 951 to inner housing 959 in the closed position, subject to control signals from security processor 953 via control bus 963. When instructed by security processor 953, latch 964 permits outer housing 951 to be extended away from inner housing 959 in the direction indicated by arrow 960.

Manual key interface 952 recovers a manually entered key provided by a user corresponding to said user for use by security processor 953. Manual key interface 952 is electrically coupled to and communicates with security processor 953 by a power and data bus 962. Security processor 953, controls latch 964 via control bus 963 and electronic access controller 971 via control bus 970 to allow or deny access to standard removable memory device 950 in accordance with a suitable algorithm, e.g. System 4 described in FIG. 4 and Method 500 described in FIG. 5.

It is appreciated that as long as outer housing 951 remains effectively latched with respect to inner housing 959 standard memory device 950 cannot be removed from removable memory device security adapter apparatus 900 without permanent, irreparable damage to standard removable memory device 950 with the ultimate effect of rendering standard removable memory device 950 unusable and inert. It is also appreciated that as long as electronic access controller 971 remains in the "prohibit" function, as instructed by security processor 953, no access to standard removable memory device 950 is possible. It is further appreciated that the standard removable memory device exemplified herein with reference to standard removable memory device 950 can have any shape, size, configuration, orientation, etc., and can house any kind of memory device, circuitry, electronic apparatus, etc.

Figure 10:
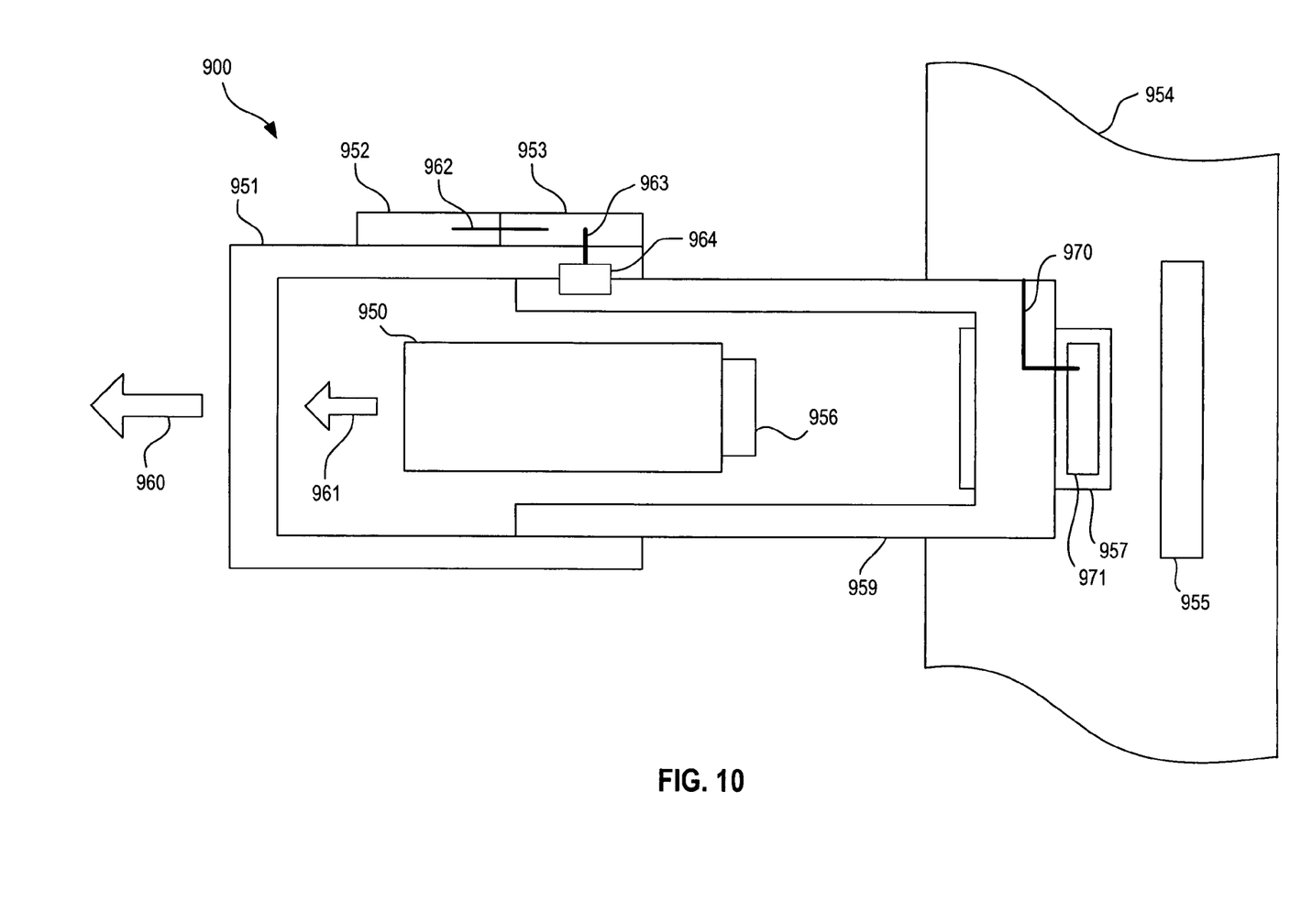
FIG. 10 depicts an exemplary removable memory device having a security processor, mechanical access controller, electronic access controller, manual key interface and an industry-standard removable memory device an "accessible" mode in accordance with an embodiment of the present invention.

FIG. 10 depicts a view exemplary removable memory device security adapter apparatus 900 according to an embodiment of the present invention. The depicted device is identical in construction to removable memory device security adapter apparatus 900 depicted in FIG. 9. In this depiction, security processor 953 has positioned latch 964 such that outer housing 951 is no longer constrained with respect to inner housing 959. Therefore outer housing 951 can be moved in the direction indicated by arrow 960. Since outer housing 951 can be extended away from inner housing 959, it no longer constrains or restrains standard removable memory device 950. Standard removable device 950 may now be removed from the removable memory device security adapter apparatus 900 and accessed using normal, non-secure methods.

What is claimed is:

1. A method for securing data on a removable memory device, comprising:
    positioning said removable memory device within an inner housing and engaging an interface connector of said removable memory device with an interface connector of said inner housing;
    contacting said removable memory device with an outer housing and constraining said removable memory device between said inner housing and said outer housing, said outer housing including an interface connector configured to engage an interface connector of a computing apparatus;
    securing said outer housing to said inner housing with a latch; and
    controlling said latch based on input of a user applied to a manual key interface.

2. The method as cited in claim 1 further comprising:
    controlling a physical removal of said removable memory device from said inner housing.

3. The method as cited in claim 2 wherein said controlling is accomplished through said latch, wherein said latch selectively permits moving of said outer housing relative to said inner housing to allow removal of said removable memory device from said inner housing.

4. The method as cited in claim 1 further comprising:
    controlling electronic data access of said removable memory device from said computing apparatus.

5. The method as cited in claim 4 wherein said electronic data access comprises any combination of one or more of reading, writing, deleting, or modifying said data.

6. The method as cited in claim 4 wherein said controlling electronic data access comprises permanently erasing and deleting said data if said access is attempted by said user when said user is not authorized.

7. The method as cited in claim 1 further comprising:
    authenticating an identity of a user attempting to access said removable memory device, including approving a manual parameter associated with said user applied to said manual key interface;
    upon said authenticating, wherein if said user identity corresponds to authorized access, enabling access to said removable memory device; and
    upon said authenticating, wherein if said user identity does not correspond to authorized access, inhibiting access to said removable memory device.

8. The method as cited in claim 1 wherein said constraining said removable memory device includes preventing disengaging of said interface connector of said removable memory device from said interface connector of said inner housing.

9. An apparatus for securing data on a removable memory device comprising:
    a housing including an inner housing and an outer housing coupled to said inner housing, said inner housing configured to receive said removable memory device, said outer housing configured to contact said removable memory device and constrain said removable memory device between said inner housing and said outer housing, said inner housing including an interface connector configured to engage an interface connector of said removable memory device, and said outer housing including an interface connector configured to engage an interface connector of a host data processing apparatus;
    a latch configured to secure said outer housing to said inner housing; and
    a manual key interface configured to receive input from a user for control of said latch.

10. The apparatus of claim 9 further comprising a security processor configured to process said input from said user and control said latch based on authorization of said user.

11. The apparatus of claim 10 further comprising an electronic access controller configured to control access to data on said removable memory device,
    wherein said security processor is further configured to control said electronic access controller based on said authorization of said user.

12. The apparatus of claim 11 wherein said security processor and said electronic access controller are supported by said housing.

13. The apparatus as cited in claim 9 wherein said manual key interface controls access to said removable memory device, and said control of access to said removable memory device comprises controlling a physical removal of said removable memory device from said housing.

14. The apparatus as cited in claim 13 wherein said controlling of a physical removal of said removable memory device is accomplished through said latch, wherein said latch selectively permits said outer housing to be moved relative to said inner housing to allow removal of said removable memory device from said inner housing.

15. The apparatus as cited in claim 9 wherein said manual key interface controls access to said removable memory device, and said control of access to said removable memory device comprises controlling an electronic access to said data comprising any combination of one or more of reading, writing, deleting, or modifying said data.

16. The apparatus as cited in claim 15 wherein said controlling of an electronic access to said data is accomplished through a switch apparatus that selectively prevents electronic data access of said removable memory device from said host data processing apparatus.

17. The apparatus as cited in claim 9 wherein said manual key interface controls access to said removable memory device, and said control of access to said removable memory device comprises permanently erasing or deleting said data if said access is attempted by said user when said user is not authorized.

18. The apparatus as cited in claim 9 wherein said manual key interface is supported by said housing.

19. The apparatus as cited in claim 9 further comprising a status indicator providing at least one of a visual indication and an audible indication of a state of accessibility of said removable memory device.

20. The apparatus as cited in claim 9 wherein said outer housing prevents physical removal of said removable memory device from said inner housing and disengagement of said interface connector of said removable memory device from said interface connector of said inner housing.

* * * * *

UNITED STATES PATENT AND TRADEMARK OFFICE
CERTIFICATE OF CORRECTION

| | | |
|---|---|---|
| PATENT NO. | : 7,938,863 B2 | |
| APPLICATION NO. | : 11/216253 | |
| DATED | : May 10, 2011 | |
| INVENTOR(S) | : David Norton Skinner et al. | |

It is certified that error appears in the above-identified patent and that said Letters Patent is hereby corrected as shown below:

Title page, Item (73), Assignee, in column 1, line 2, delete "Compnay," and insert -- Company, --, therefor.

Signed and Sealed this
Thirteenth Day of March, 2012

David J. Kappos
*Director of the United States Patent and Trademark Office*